United States Patent [19]
Tada et al.

[11] Patent Number: 5,745,881
[45] Date of Patent: Apr. 28, 1998

[54] KANA-KANJI CONVERSION SYSTEM AND A METHOD FOR PRODUCING A KANA-KANJI CONVERSION DICTIONARY

[75] Inventors: Masami Tada, Sagamihara; Seiji Yuge, Yokohama; Shichiro Miyashita, Yamato, all of Japan

[73] Assignee: International Business Machines Corporation, Armonk, N.Y.

[21] Appl. No.: 563,815

[22] Filed: Nov. 28, 1995

[30] Foreign Application Priority Data

Nov. 29, 1994 [JP] Japan ................. 6-294087

[51] Int. Cl.$^6$ .................................. G06F 17/28
[52] U.S. Cl. ................................. 705/10
[58] Field of Search ................. 395/760, 754, 395/757; 705/10, 4, 7

[56] References Cited

U.S. PATENT DOCUMENTS

| | | |
|---|---|---|
| 5,047,932 | 9/1991 | Hsieh ........................... 395/760 |
| 5,136,504 | 8/1992 | Fushimoto ...................... 395/760 |
| 5,406,480 | 4/1995 | Kanno ........................... 395/760 |

FOREIGN PATENT DOCUMENTS

| | | | |
|---|---|---|---|
| 60-3016 | 1/1985 | Japan | 395/760 |
| 60-142464 | 7/1985 | Japan | 395/760 |
| 60-251461 | 12/1985 | Japan | 395/760 |

OTHER PUBLICATIONS

Tetsuo Araki et al., "A Method of Correcting Provisional Boundaries of 'Bunsetsu'", IEEE International Workshop on Robot and Human Communication, pp. 289–293, Jul. 1994.

*Primary Examiner*—Donald E. McElheny, Jr.
*Attorney, Agent, or Firm*—David A. Mims, Jr.

[57] ABSTRACT

A conversion function for a large Kana-Kanji conversion dictionary. According to the present invention, a Kana-Kanji conversion dictionary is prepared together as a program that includes a search function. Especially in an operating system that supports a dynamic link library routine (DLL), a Kana-Kanji conversion dictionary program is compiled as a DLL, and the dictionary search function is exported so that it can be employed by another program to be usable.

11 Claims, 1 Drawing Sheet

KANA-KANJI CONVERSION SYSTEM AND A METHOD FOR PRODUCING A KANA-KANJI CONVERSION DICTIONARY

BACKGROUND OF THE INVENTION

1. Field of the Invention

The present invention relates to personal computers, and more particularly, to a Kana-Kanji conversion system.

2. Description of the Related Art including information disclosed under 37 CFR 1.97–1.99.

When the first word group conversion systems that ran on personal computers appeared, the size of the Kana-Kanji conversion dictionaries that were provided ranged from around 720 KB to 1.44 MB, or roughly the size of the memory capacity of a single floppy disk.

This is because in those days hard disks were not in general use, and of necessity, the Kana-Kanji conversion systems that were available had to be based on a floppy disk. However, as the use of hard disks has become widespread, the general practice today is to employ Kana-Kanji conversion systems that are stored on hard disks. Accordingly, the size of the dictionaries for use with these Kana-Kanji conversion systems is essentially unlimited.

The outlines of the arrangement and the processing of such a conventional system will now be described.

In the production of a Kana-Kanji conversion system, first to be designed is a dictionary format. Generally, this is a binary file form with an optimized size (called a compression format). If the contents of a dictionary were to be arranged simply as a text file, not only would there be an increase in the size of the dictionary, but there would be a corresponding reduction in the dictionary access speed.

Next to be designed is the program logic for accessing the compressed format.

Then, a dictionary production tool is designed to produce a binary data dictionary from a text database for a dictionary. And finally, a binary data dictionary having a compressed format is produced.

The processing of the thus prepared Kana-Kanji conversion system will now be explained. First, when the Kana-Kanji conversion system is loaded, it ensures that in the main memory several kilobytes of free space are available for a dictionary buffer.

Thereafter, when a user presses a Kanji conversion activation key, the Kana-Kanji conversion system opens a dictionary file, and reads the index portion of the dictionary file into the main memory.

If there are a plurality of dictionaries present, the Kana-Kanji conversion system sequentially opens the individual dictionary files and reads their index portions. (Note: In the following text, strings of letters that are used to represent Chinese characters will be preceded and followed by the symbol "l"; strings of letters that are used to represent Japanese syllabary characters will be preceded and followed by a "^".)

When conversion is requested for a series of phonemic characters that a user inputs (e.g., ^ji.do.u.sha re–.su^), the Kana-Kanji conversion system searches the index for segments of the series of phonemic characters that were input. The segments for the series of phonemic characters in ^ji.do.u.sha re–.su^ are ^ji^, ^do.^, ^u^, ^sha^, ^re–^, ^su^, ^ji.do^, ^u.sha^, ^sha re–^, ^re–.su^, ^ji.do.u^, ^do.u.sha^, ^u.sha re–^, ^sha re–.su^, ^ji.do.u.sha^, ^do.u.sha re–^, ^u.sha re–su^, ^ji.do.u.sha re–^, ^do.u.sha re–^, ^u.sha re–.su^, ^ji.do.u.sha re–^, ^do.u.sha re–su^, ^ji.do.u.sha re–u^, etc.

Then, the Kana-Kanji conversion system reads from a buffer into a dictionary file a record in which the segments of the series of phonemic characters are held, and transfers "correct transcriptions," which are choices for the phonemic characters, and the "grammar," such as the parts of speech and the frequency of use, to a work file for a presumption engine. The Kana-Kanji conversion system repeats this process for all the segments of the series of phonemic characters.

The Kana-Kanji conversion system employs the presumption engine to return the most appropriate series of characters to a user.

In the above described system that stores dictionary files either on a floppy disk or on a hard disk, multiple disk accesses occur for one series of phonemic characters. Under these circumstances, the Kana-Kanji conversion speed cannot be very high.

Although such a shortcoming may be corrected by loading the entire dictionary file into the main memory, only a main memory of maximum 640 KB can be used in an MS-DOS (Microsoft trademark) system that employs as a base the Intel (Intel Corporation Trademark) 8086 architecture, and a normal sized dictionary file cannot be loaded into the main memory.

However, for a CPU such as an 80386, with which 32-bit addressing is possible, the main memory may be expanded to from 4 MB to 64 MB, and with an operating system, such as Windows (Microsoft trademark) or OS/2 (IBM trademark), that uses extended memory and can support a virtual storage system, an entire dictionary of about 4 MB can be loaded into the main memory.

When there is a request by a user, the normal practice is to refer to a plurality of dictionaries for names, addresses, medical terms, etc. Further, as the Kana-Kanji conversion system requires a much larger dictionary when an AI function is included, and as dictionaries of 10 MB to 100 MB are coming into use, an entire dictionary file can not always be loaded into the limited storage that is actually available.

A so-called virtual storage system is a necessity if there is a requirement that a dictionary file be loaded into the limited storage that is actually available. Since, as a rule, operating systems, such as OS/2 and Windows, do not provide virtual storage systems for loading data files into main memory, the designer of a Kana-Kanji conversion system has to write a program to provide such a virtual storage system. As a virtual storage system is itself complicated, it is difficult to construct a viable, independent virtual storage system for an application program.

SUMMARY OF THE INVENTION

One object of the present invention is to enable the use of a Kana-Kanji conversion dictionary having an arbitrary size by using a standard function that is included in an operating system.

Another object of the present invention is to enable the use of a Kana-Kanji conversion dictionary having an arbitrary size with no reduction in Kana-Kanji conversion speed.

These objectives are achieved by preparing a Kana-Kanji conversion dictionary that is an integral part of a program. Especially with an operating system, such as OS/2 or Windows, that supports a dynamic link library routine (hereafter referred to as a "DLL"), it is preferable that the above described Kana-Kanji conversion dictionary program be provided as a DLL. In this case, the loading of the program to a main memory and the preparation of a swap file are performed by using standard functions of the operating system.

Further, in an operating system, such as OS/2 (IBM trademark) Ver 2.1, that provides a 32-bit API, a Kana-Kanji conversion dictionary program is compiled by using a 32-bit compiler, such as C Set++, which is available from IBM Corp., so that it is possible to employ 32-bit addressing to advantage, a larger dictionary size and a Kana-Kanji conversion function with higher performance can be obtained.

DESCRIPTION OF THE PREFERRED EMBODIMENTS

One embodiment of the present invention will now be described while referring to the accompanying drawings.

A. Hardware arrangement

Figure 1:
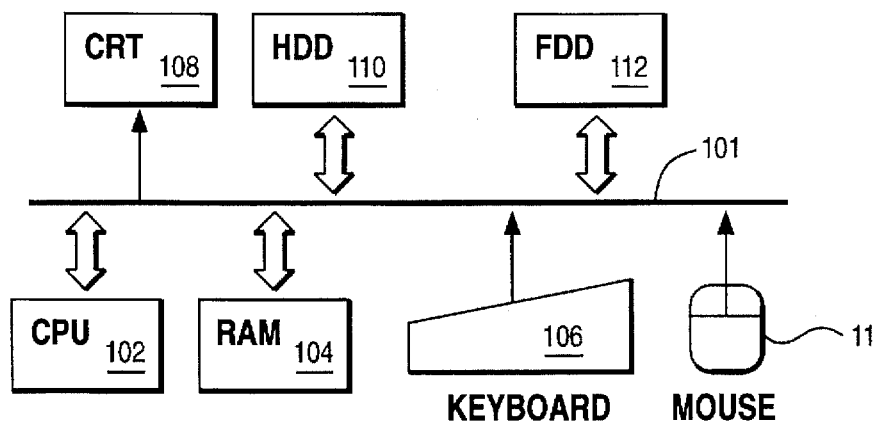
FIG. 1 is a block diagram illustrating a hardware arrangement that is employed for the present invention.

FIG. 1 is a schematic diagram illustrating the arrangement of a system according to the present invention. This is the general arrangement, wherein connected to a bus 101 are a central processing unit (CPU) 102, which has an operation function and input/output control function; a main memory (RAM) 104, which provides a work area for the CPU 102; a keyboard 106, keys of which are employed to input commands and instructions for a series of characters and for Kana-Kanji conversion; a display device 108, which can display characters and figures; a hard disk (HDD) 110, which is a storage device on which are stored an operating system for controlling the CPU 102 and a Kana-Kanji conversion program file; a floppy disk drive (FDD) 112, which is employed for the reading of data from and the writing of data to a floppy disk; and a mouse 114, which is employed to point to an arbitrary position on a screen of display device 108 and to facilitate the transmission of information concerning the position to the CPU 102.

Preferably, on the keyboard 106 are provided an English/numeral key, symbol keys, a return key, a Kanji key for entering a Kana-kanji conversion mode, and a conversion key for initiating a Kana-Kanji conversion process after "phonemic" characters have been input.

The CPU 102 employed in this embodiment is, for example, a 80386, a 80486, a Pentium (Intel trademark), or other compatible chips.

A desirable operating system is Windows (Microsoft trademark), OS/2 (IBM trademark), or any such other operating system that supports the use of an extended memory, a DLL loading function, and a virtual storage, multi-window GUI environment. It should be noted, however, that, by using a program such as a DOS extender, the present invention can even be run on an MS-DOS (Microsoft trademark) or a PC-DOS system, or other standard operating systems that do not support a DLL.

B. Structure of a Kana-Kanji conversion program

B1. Dictionary program

The structure of a Kana-Kanji conversion program according to the present invention will now be explained by using codes in the C programming language (or pseudo codes). An example Kana-Kanji conversion program according to the present invention includes the dict.h header files, dict.c source files, and dict.def module definition files, as indicated below.

The contents of a dict.h header file which are described below, define the structure of dictionary entries.

TABLE 1

```
typedef struct tagDictInfo {
    unsigned char *key;
    unsigned char *data;
    unsigned short grammar;
    unsigned short freq;
    unsigned short reserved;
} DICT_INFO, *PDICT_INFO;
```

In this structure, "key" denotes a key (phonemic) that is employed for searching; "data" denotes data (phrase) that correspond to the keys; "grammar" denotes a grammatical category (part of speech) that is used by the presumption engine of the Kana-Kanji conversion system; and "freq" denotes a frequency at which a phrase appears.

The contents of a dict.c source file, which are described below, include the array dict_data of actual dictionary entries, and a mathematical function SearchDictData that searches through a dictionary and returns a pointer to a dictionary entry that is found. The dictionary entries and the search function may be designated as individual source files.

TABLE 2

```
#include "dict.h"
DICT_INFO dict_data[70000] = {
    {^ji · do · u · sha^, |jidoushal, NOUN, HIGH, 0},
    {^no · ru^, |nol · ^ru^, VERB, HIGH, 0},
    ...
};
PDICT_INFO SearchDictData (key)
    unsigned char *key;
{
    int num; // int represents 32 bits in a 32-bit mode
    ...
    return &dict_data[num];
}
```

In the above described code, {^ji.do.u.sha^, |jidoushal, NOUN, HIGH, O} is one of the dictionary entries. In the structure, DICT_INFO, ^ji.do.u.sha^ corresponds to "phonemic characters," |jidoushal corresponds to a "phrase," NOUN corresponds to grammar, and HIGH corresponds to freq. In this embodiment, HIGH and LOW, which respectively indicate high frequency and low frequency, correspond to freq. Besides NOUN (noun), grammar can have other values, such as VERB (verb) or ADJ (adjective). Although the values that grammar and freq can take are not described, they are defined in advance in a header file by using enum.

Based on a pointer to a series of characters, which is a "key" that was provided as an argument, the function SearchDictData(key) calculates the number, num, of the dictionary arrangement, dict_data, that has a key (phonemic) which matches the initial "key," and returns the address with dict_data[num], thereby permitting dict_data [num] to be accessed directly.

One method for performing the SearchDictData(key) sorts the entry dict_data[70000] in advance at a "phonemic character" portion. Then, based on a pointer to a series of characters, "key," that is provided as an argument, a two-character search is employed for the "phonemic" character portion of the dict_data[70000] entry, and a number, num, of an entry that contains corresponding phonemic characters is acquired.

According to another method, a dictionary entry is sorted in advance at the "phonemic character" portion, an index table is prepared so as to return the entry number of a first dictionary entry that includes phonemic characters that correspond to the first two phonemic characters (e.g., ^ji.do^ in ^ji.do.u.sha^), and a linear search is begun with the entry number for a matched dictionary entry. There can be various other method for fast access.

To achieve these methods, dictionary program source code, such as in dict.c, can be automatically generated by using a tool that sorts dictionary entries that are based on phonemic characters, extracts entries from a previously prepared database for the dictionary, and prepares an index table in advance that is based on the extracted dictionary entries.

The contents of dict.def are as follows. In the module definition file, a function, SearchDictData, is exported to indicate that this is applicable to other programs.

TABLE 3

| LIBRARY | DICT | |
|---|---|---|
| CODE | LOADONCALL MOVEABLE DISCARDABLE | |
| DATA | LOADONCALL MOVEABLE SINGLE | |
| EXPORTS | WEP | @1 RESIDENTNAME |
| | SearchDictData | @2 |

These are complied and linked together to prepare, for example, dict.dll, a dynamic link library routine that includes both the contents of a dictionary and the search function. It should be noted that the next line SearchDictData of EXPORTS in dict.def is a program into which dict.dll is loaded, and shows that the SearchDictData function can be used.

B2. Example program for calling a dictionary program

An example program for calling a dictionary program is as follows.

TABLE 4

```
#include "dict.h"
HANDLE hLib;
void Init(void)
{
    .....
    hLib = LoadLibrary(DLL dictionary name);
    IpSearchDictData =
    GetProcAddress(hLib, "SearchDictData");
    .....
}
void End(void)
{
    .....
    FreeLibrary(hLib);
    .....
}
void main()
{
    Init();
    .....
    while ( bProcess) {
        .....
        /* a character was input at the keyboard */
        if (input character is a conversion key) {
            if ( (prDictData=(* IpSearchDictData) (key)) ! =
            NULL) {
                /* process when data corresponding to key
                is present */
            }
            else {
                /* process when data corresponding to key
                is not present */
            }
        }
        else {
            /* add the input character to key */
```

TABLE 4-continued

```
        }
        .....
    }
    .....
    End();
}
```

Figure 2:
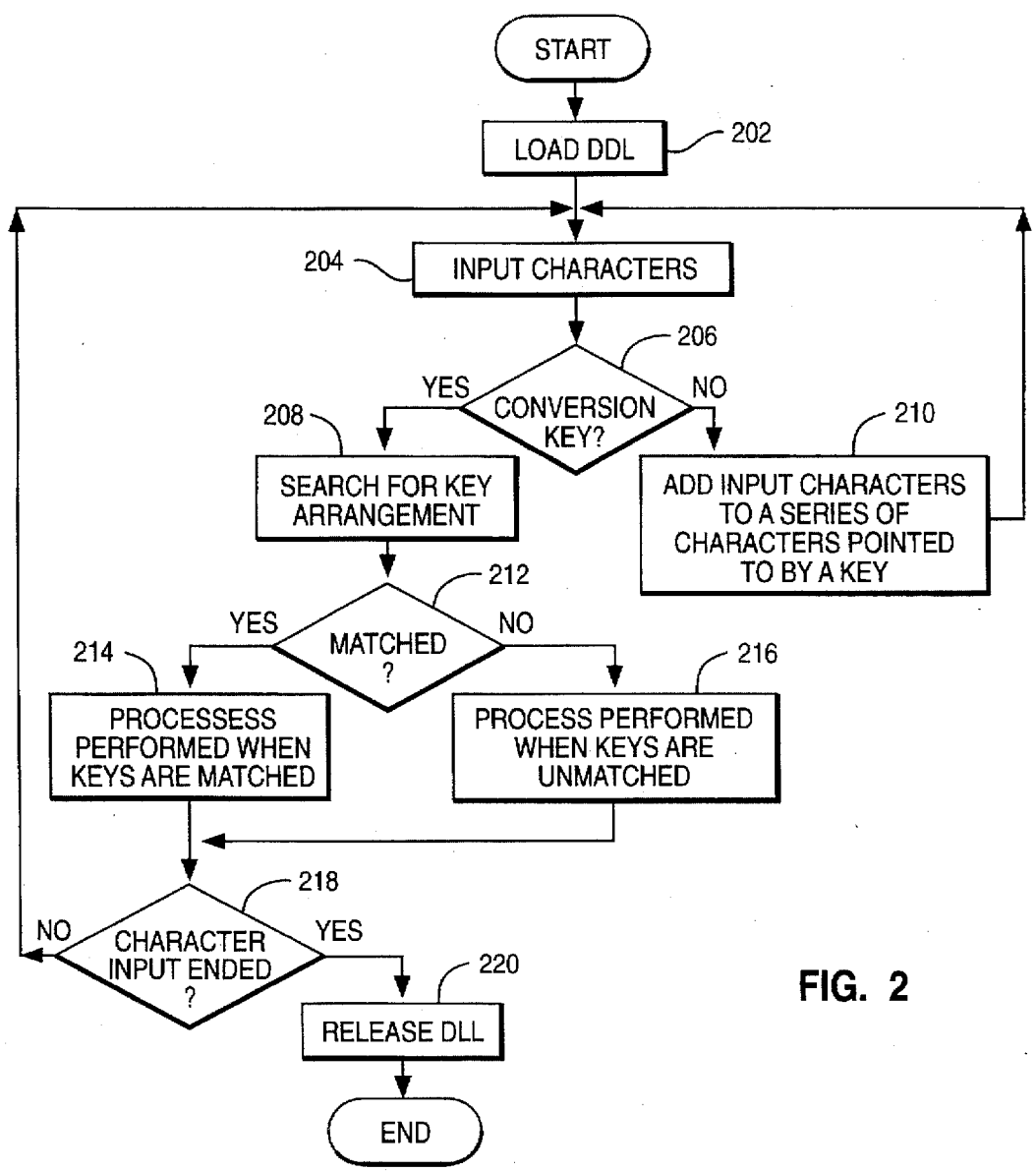
FIG. 2 is a flow chart showing the processing for Kana-Kanji conversion.

The processing of the present invention will now be described while referring to the above described program code and the flowchart in FIG. 2.

In the program code, the DLL dictionary name in hLib= LoadLibrary(DLL dictionary name) in Inito is, for example, the file "dict.dll" that is prepared above. With this code, the file dict.dll is loaded into the main memory. This process corresponds to the procedure at step 202 in the flowchart in FIG. 2.

IpSearchDictData=GetProcAddress(hLib, "SearchDictData") is a procedure for acquiring an address of a function that is to be called, SearchDictData in dict.dll.

FreeLibrary(hLib) in Endo is a procedure for releasing the DLL dictionary that is loaded at hLib=LoadLibrary(DLL dictionary name).

In the program code, bProcess is a flag that is set to "1" all during the operation of the Kana-Kanji conversion system. In other words, during the operation of the KanaKanji conversion system, the statements that are enclosed in the "while" loop between step 204 and step 218 are executed repeatedly.

In the while loop, when a conversion key is depressed after a character is input at the keyboard (step 202 in FIG. 2), the determination at step 206 is affirmative, and at step 208, the entry in the DLL dictionary is searched for by calling the function prDictData=(* IpSearchDictData)(key). If the result is not NULL, it is assumed that the dictionary entry that corresponds to the key was found at step 212, and a process that is employed when data is found that corresponds to the key, e.g., a process for adding the resultant data to a phrase, is executed at step 214.

Although it is not represented in the above program code, a series of characters that is pointed to by the "key" in prDictData=(* IpSearchDictData)(key) is not always the entire series of characters that are input by keys. Generally, a program called a presumption engine is also included in the above program code, or in other source code that is normally compiled. The presumption engine divides the entire series of characters input by keys into proper segments that correspond to the series of characters, and accesses a Kana-Kanji conversion dictionary multiple times by employing as "keys" the individual segments of the series of characters.

If the result obtained by calling the function prDictData=(* IpSearchDictData)(key) is NULL, it is assumed that the dictionary entry that corresponds to the key has not been found. At step 216, therefore, another segment of the series of characters is selected by the presumption engine, or another process that is employed when the key does not correspond to the dictionary entry is executed.

If, at step 206, the input character is not a code that has been acquired as the result of the depression of a conversion key, only a process that involves the adding of the input character to a series of characters pointed to by a key, is performed (step 210), and program control returns to step 204.

The termination of the character input at step 218 is performed, for example, by again depressing a Kanji key.

Then, the flag bProcess is set to "0," and the process exits the while loop. In the flowchart in FIG. 2, the program control advances from step 218 to step 220.

At step 220, the Kana-Kanji conversion program DLL is released by calling ENDO.

In this embodiment, a single Kana-Kanji dictionary DLL is loaded and released; however, a plurality of Kana-Kanji DLLs can be sequentially loaded, with the GetProcAddress function being employed to acquire an address for calling the search function of the individual Kana-Kanji dictionary DLLS, and at step 212, the above described search can be performed for each Kana-Kanji dictionary DLL that has been loaded. In this case, at step 220, all the loaded Kana-Kanji dictionary DLLs are released. This process is required when there are one or more special Kana-Kanji dictionaries for medical terms, computer terms, etc., employed in addition to a basic Kana-Kanji dictionary.

A basic Kana-Kanji dictionary DLL may usually be loaded and other special Kana-Kanji dictionary DLLs may be loaded or released at the user's discretion or as specified in the user's setup.

Further, a comparatively small user-defined Kana-Kanji conversion dictionary, which enables a user to arbitrarily add "phonemic characters" or "phrases," is provided not in a program form like a DLL, but is instead provided as a data file that is a part of the conventional Kana-Kanji conversion system.

C. Other embodiment

In the above described embodiment, the Kana-Kanji dictionary program is provided as a DLL, which is loaded into the main memory as needed by using the standard function of the operating system. A standard, single task operating system such as MS-DOS (Microsoft trademark) does not include a function for loading a DLL into the main memory. However, such MS-DOS systems that employ a CPU, such as the 80386 or the 80486, which can use an extended memory of 1 MB or larger, that include a main memory of at least 4 MB and provide as an API a function such as a DOS extender for loading a program into an extended memory, can use a Kana-Kanji dictionary program in an EXE form that is generated by compiling a source file, which includes the following dictionary entry and search functions.

TABLE 5

```
#include "dict.h"
DICT_INFO dict_data[70000] = {
        {^ji·do·u·sha^, |jidousha|, NOUN, HIGH, 0},
        {^no·ru^, |no|·^ru^, VERB, HIGH, 0},
        .....
};
PDICT_INFO SearchDictData(key)
        unsigned char *key;
{
        int num;
        .....
        return &dict_data[num];
}
void main()
{
        .....
    ,   while ( bProcess) {
        .....
                /* a character was input at the keyboard */
                if (an input character is a conversion key) {
                        if ( (prDictData=(* SearchDictData(key)) !=
                        NULL) {
                                /* process when data corresponding to the
                                key is present */
                        }
```

TABLE 5-continued

```
                        else {
                                /* process when data corresponding to the
                                key is not present */
                        }
                }
                else {
                        /* add the input character to the key */
                }
        .....
        }
        .....
}
```

D. Specific example of a search process

When a user inputs ^ji.do.u.sha^ by using keys and depresses a conversion key, the presumption engine properly divides a series of input characters and searches the Kana-Kanji DLL.

TABLE 6

| Key | Data |
|---|---|
| ^ji^ ^do^ ^u^ ^sha^ | |ji| |do| |u| |sha| |
| ^ji^ ^do · u^ ^sha^ | |ji| |dou| |sha| |
| ^ji^ ^do · u · sha^ | |ji| |dousha| |
| ^ji · do^ ^u^ ^sha^ | (a key for ^ji · do^ is not present) |
| ^ji · do^ ^u · sha^ | (a key for ^ji · do^ is not present) |
| ^ji · do · u · ^ ^sha^ | |jidou| |sha| |
| ^ji · do · u · sha^ | |jidousha| |

Through the process steps that are shown in the above table, |jidousha| finally is selected. When the conversion key is depressed again, another appropriate phrase (if present) is searched for.

As described above, according to the present invention, since a Kana-Kanji dictionary can be prepared in an executable program form, such as a DLL or an EXE, the following substantial effects can be obtained.

(1) Even a Kana-Kanji dictionary that is larger than the actually available storage can be loaded into the main memory by using the standard virtual storage control function of an operating system. A designer of a Kana-Kanji conversion system does not have to write the special code that is required to prepare an independent virtual storage control function.

(2) Since as much as is possible of even a large Kana-Kanji dictionary is loaded into the main memory, a search process can be executed at high speed.

(3) Since the same language that is used for describing the presumption engine can be used to prepare a Kana-Kanji dictionary, the presumption engine can easily interface with the Kana-Kanji dictionary.

(4) A special dictionary preparation tool is not required for preparing a Kana-Kanji dictionary, and a common compiler and a linker can be used.

While the invention has been shown and described with reference to particular embodiments thereof, it will be understood by those skilled in the art that the foregoing and other changes in form and detail may be made therein without departing from the spirit and scope of the invention.

What we claim is:

1. A method, for preparing a dictionary program for a Kana-Kanji conversion system, comprising the steps of:

(a) describing in source code entries for a Kana-Kanji conversion dictionary that at least include phonemic characters and corresponding phrases as a data arrangement or a list in a predetermined programming language;

(b) searching said data arrangement or said list in said Kana-Kanji conversion dictionary in consonance with determined phonemic characters, and describing, in said source code in said predetermined programming language, a search function for providing a corresponding phrase or a pointer to said phrase; and (c) compiling said source code by using a compiler for said predetermined programming language and preparing a Kana-Kanji conversion dictionary program.

2. A method for preparing a dictionary program for a Kana-Kanji conversion system according to claim 1, wherein said predetermined programming language is C or C++.

3. A method for preparing a dictionary program for a Kana-Kanji conversion system according to claim 1, wherein said Kana-Kanji conversion dictionary program is prepared as a dynamic link library (DLL) routine.

4. A method, for preparing a dictionary program for a Kana-Kanji conversion system, comprising the steps of:

(a) describing in first source code entries for a Kana-Kanji conversion dictionary that at least include phonemic characters and corresponding phrases as a data arrangement or a list in a predetermined programming language;

(b) searching said data arrangement or said list in said Kana-Kanji conversion dictionary in consonance with determined phonemic characters, and describing, in second source code in said predetermined programming language, a search function for providing a corresponding phrase or a pointer to said phrase; and (c) compiling said first and said second source codes by using a compiler for said predetermined programming language and preparing a Kana-Kanji conversion dictionary program.

5. A method for preparing a dictionary program for a Kana-Kanji conversion system according to claim 4, wherein said predetermined programming language is C or C++.

6. A method for preparing a dictionary program for a Kana-Kanji conversion system according to claim 4, wherein said Kana-Kanji conversion dictionary program is prepared as a dynamic link library (DLL) routine.

7. A Kana-Kanji conversion method, which employs said Kana-Kanji conversion dictionary program DLL that is prepared by a method cited in claim 3 or 6, comprising the steps of:

(a) loading said Kana-Kanji conversion dictionary program DLL into a main memory;

(b) storing into a buffer a character input by a user at a keyboard; and (c) in response to a user's instruction to initiate Kana-Kanji conversion, transmitting a series of characters that are stored in said buffer to a search function of said Kana-Kanji conversion dictionary program DLL, and searching for a phrase that corresponds to said series of characters.

8. A Kana-Kanji conversion method according to claim 7, further comprising a step of, in response to a user's instruction to terminate Kana-Kanji conversion, releasing said Kana-Kanji conversion dictionary program DLL.

9. A Kana-Kanji conversion method, which employs a plurality of said Kana-Kanji conversion dictionary program DLL that is prepared by a method cited in claim 3 or 6, comprising the steps of:

(a) sequentially loading a plurality of said Kana-Kanji conversion dictionary program DLLs into a main memory;

(b) storing into a buffer a character input by a user at a keyboard; and (c) in response to a user's instruction to initiate Kana-Kanji conversion, sequentially transmitting a series of characters that are stored in said buffer to a search function of a plurality of said Kana-Kanji conversion dictionary program DLLs, and searching for a phrase that corresponds to said series of characters.

10. A Kana-Kanji conversion method according to claim 9, further comprising a step of, in response to a user's instruction to terminate Kana-Kanji conversion, releasing a plurality of said Kana-Kanji conversion dictionary program DLLs.

11. A Kana-Kanji conversion system comprising:

(a) a main memory;

(b) means for enabling the calling of a Kana-Kanji conversion dictionary program DLL, which contains Kana-Kanji conversion dictionary entries, which at least include phonemic characters and corresponding phrases, as a data arrangement or a list in a predetermined programming language;

(c) means for loading said Kana-Kanji conversion dictionary program DLL into said main memory;

(d) a keyboard;

(e) means for storing in a buffer a character that is input at said keyboard; and (f) means for searching through a Kana-Kanji conversion dictionary program DLL for a Kana-Kanji conversion dictionary entry in consonance with a series of characters that are stored in said buffer.

* * * * *

UNITED STATES PATENT AND TRADEMARK OFFICE
CERTIFICATE OF CORRECTION

PATENT NO : 5,745,881
DATED : April 28, 1998
INVENTOR(S): Tada et al

It is certified that error appears in the above-identified patent and that said Letters Patent is hereby corrected as shown below:

Column 6, line 14, please delete "Inito" and insert --Init ( )--;
6, line 22, please delete "Endo" and insert --End ( )--;
7, line 5, please delete "ENDO" and insert --End ( )--.

Signed and Sealed this

First Day of June, 1999

Q. TODD DICKINSON

Attest:

Attesting Officer

Acting Commissioner of Patents and Trademarks